(12) United States Patent
Tomizawa et al.

(10) Patent No.: US 8,394,480 B2
(45) Date of Patent: Mar. 12, 2013

(54) OPTICAL INFORMATION RECORDING MEDIUM AND MANUFACTURING METHOD THEREFOR

(75) Inventors: Yuji Tomizawa, Takasaki (JP); Kazushige Koyama, Takasaki (JP); Motomitsu Hagiwara, Takasaki (JP)

(73) Assignee: Taiyo Yuden Co., Ltd., Tokyo (JP)

(*) Notice: Subject to any disclaimer, the term of this patent is extended or adjusted under 35 U.S.C. 154(b) by 211 days.

(21) Appl. No.: 12/935,475

(22) PCT Filed: Mar. 31, 2009

(86) PCT No.: PCT/JP2009/057150
§ 371 (c)(1),
(2), (4) Date: Sep. 29, 2010

(87) PCT Pub. No.: WO2009/123353
PCT Pub. Date: Oct. 8, 2009

(65) Prior Publication Data
US 2011/0020581 A1   Jan. 27, 2011

(30) Foreign Application Priority Data
Mar. 31, 2008   (JP) .................. 2008-090367

(51) Int. Cl.
*B32B 3/02* (2006.01)

(52) U.S. Cl. .... 428/64.1; 428/64.4; 427/595; 156/275.5

(58) Field of Classification Search ................ 428/64.4
See application file for complete search history.

(56) References Cited

U.S. PATENT DOCUMENTS

| 7,427,432 | B2 | 9/2008 | Furomoto |
| 2003/0235655 | A1 | 12/2003 | Mitsuhata et al. |
| 2007/0125302 | A1 | 6/2007 | Horikawa |
| 2007/0297315 | A1 | 12/2007 | Aga et al. |
| 2008/0053618 | A1 | 3/2008 | Kubota et al. |
| 2009/0188615 | A1 | 7/2009 | Hayashi et al. |

FOREIGN PATENT DOCUMENTS

| CN | 1950900 A | 4/2007 |
| EP | 1739667 A1 | 1/2007 |
| EP | 1752980 A1 | 2/2007 |

(Continued)

OTHER PUBLICATIONS

The extended European search report by the European Patent Office dated Sep. 23, 2011, for European application No. 09726790.0.

(Continued)

*Primary Examiner* — Elizabeth Mulvaney
(74) *Attorney, Agent, or Firm* — Law Office of Katsuhiro Arai (57) ABSTRACT

A multilayer type optical information recording medium in which in multilayering of a write-once type optical information recording medium, when a second film is formed using a metallic stamper, a protective layer composed of an inorganic material is free from peeling, is provided. In the multilayer type optical information recording medium including an interlayer, the interlayer is constituted by multiple films of a first film contacting a protective layer and a second film contacting a reflection layer; materials of the first and second films are constituted of materials different from each other; and a peeling resistance of the material of the first film against a material of the protective layer of the first optical information recording layer is higher than that of the second film.

12 Claims, 4 Drawing Sheets

FOREIGN PATENT DOCUMENTS

| | | |
|---|---|---|
| EP | 1764794 A1 | 3/2007 |
| JP | 62-36756 A | 2/1987 |
| JP | 2003-77191 A | 3/2003 |
| JP | 2003-272244 A | 9/2003 |
| JP | 2004-145984 A | 5/2004 |
| JP | 2005-243165 A | 9/2005 |
| JP | 2005-332564 A | 12/2005 |
| JP | 2006-073086 A | 3/2006 |
| JP | 2007-179703 A | 7/2007 |
| JP | 2007-185896 A | 7/2007 |
| JP | 2008-21393 A | 1/2008 |
| WO | 2007/058309 A | 5/2007 |
| WO | 2007/135907 A | 11/2007 |

OTHER PUBLICATIONS

Notification of First Office Action issued by Chinese Patent Office, mailed Dec. 21, 2011, in the Chinese counterpart application.

Notification of Reasons for Refusal issued by the Japanese Patent Office, mailed Jan. 18, 2013, for Japanese counterpart application No. 2008-090367.

OPTICAL INFORMATION RECORDING MEDIUM AND MANUFACTURING METHOD THEREFOR

This application is the U.S. National Phase under 35 U.S.C. §371 of International Application PCT/JP2009/057150, filed Mar. 31, 2009, which claims priority to Japanese Patent Application No. 2008-090367, filed Mar. 31, 2008. The International Application was published under PCT Article 21(2) in a language other than English.

TECHNICAL FIELD

The present invention relates to a write-once type optical information recording medium which can undergo recording and playback and a method for manufacturing the same. In particular, the invention relates to multilayering of an optical information recording layer and a layer configuration thereof.

BACKGROUND ART

In recent years, in order to record a high-definition image data, an optical information recording medium has been required to have a high information recording density. In order to respond to such a requirement, there has been developed a Blu-ray disc (BD-R) using a blue laser beam on a short-wavelength side in the vicinity of from 360 to 450 nm, for example, about 405 nm. An optical information recording medium having a structure in which an optical reflection layer and a recording layer are formed on the light incident surface side of a light transmission resin substrate and a light transmission layer is provided on the surface on which these optical reflection layer and recording layer are formed, or a structure in which the light transmission layer is provided via a protective layer is used. The recording layer of such an optical recording medium is constituted of an organic material including a dye such as an azo-based dye, a cyanine-based dye, etc., or an inorganic material such as a Te—Pd-based material, an Si—Cu-based material, a Ge—Bi-based material, etc., and data is recorded by forming pits upon laser irradiation for recording.

Also, in the foregoing optical information recording medium, for the purpose of further increasing its volume of recording information, there is proposed a multilayer type optical information recording medium having a plurality of recording layers.

For example, Patent Document 1 discloses an optical information recording medium in which a first substrate having a first information layer where at least a first recording layer composed of an organic dye and a semitransparent first reflection layer are accumulated and a second substrate having a second information layer where at least a second reflection layer and a second recording layer composed of an organic dye are stacked and fixed via a transparent interlayer such that the stacked layers are opposed to each other.

Also, Patent Document 2 discloses an optical information recording medium having a plurality of recording layers in the stacking direction on a substrate and being capable of undergoing recording and playback by a laser beam, wherein a reflection layer, a recording layer and a functional layer composed of $SiO_2$ are stacked successively on the substrate; an interlayer is formed thereon; a semitransparent reflection film, a recording layer and a functional layer composed of $SiO_2$ are further stacked successively on the interlayer.

Now, in an optical recording medium having a recording layer on the both surfaces thereof, such as DVD, etc., in place of a method for stacking transparent resin substrates having a reflection layer formed on the irregular surface with an adhesive in such a manner that the reflection layers are opposed to each other, there was conventionally provided a photocurable resin layer on a reflection layer of an optical disc substrate having a reflection layer (or a recording layer) on the irregular surface by means of coating. On the other hand, there is proposed a method in which a photocurable resin is provided on a stamper made of a polycarbonate by means of coating; thereafter, a substrate is face-reversed to bond the substrate and the stamper to each other; an ultraviolet ray is irradiated from the substrate side to cure the photocurable resin; and after curing, the stamper is removed, thereby forming a reflection layer (or a recording layer) and a cover layer on the irregular surface.

Also, in Patent Document 3, it is proposed to use a transfer sheet in place of the foregoing method for coating a photocurable resin. This method is concerned with a method in which a photocurable transfer sheet composed of a photocurable composition containing a reactive polymer having a photopolymerizable functional group and capable of being deformed upon pressurization is placed on the irregular surface of a substrate having irregularity as recording a pit and/or a groove on the surface thereof such that one of the surfaces thereof comes into contact with the irregular surface, these are pressed, and the photocurable transfer sheet is cured by ultraviolet radiation.

However, in the foregoing method using a transfer sheet, after the transfer sheet is cured, when the stamper is peeled off, a part of the photocured transfer layer of the photocurable transfer sheet often peeled off from the reflection layer such as a silver alloy, etc. and attached to the stamper. Then, in Patent Document 4, in a photocurable transfer sheet having a peeling sheet on both surfaces of a transfer layer, it is proposed to use a photocurable transfer sheet wherein when cured with an ultraviolet ray, one surface has a difference in a residual bonding rate of 3% or more from the other surface, thereby making it easy to peel from a stamper and increasing an adhesive power to a reflection layer.

However, all of these methods are concerned with DVD-ROM.

Patent Document 1: Japanese Patent Laid-open No. 2006-73086

Patent Document 2: Japanese Patent Laid-open No. 2005-243165

Patent Document 3: Japanese Patent Laid-open No. 2003-272244

Patent Document 4: Japanese Patent Laid-open No. 2007-185896

SUMMARY OF THE INVENTION

Problems that the Invention is to Solve

In the foregoing multilayer type optical information recording medium of Blu-ray disc (BD-R), as disclosed in Patent Document 1, though there is a method of manufacturing by laminating optical information recording media of the same configuration, since the Blu-ray disc has grooves narrow in a width and small pits, it is preferable to use a method in which after the irregularity of a substrate as a first layer is transferred by means of injection molding, a transfer layer is formed on the first film by a resin film or a transfer sheet for the irregularity formation of a second layer, and a pit or a groove is formed using a metallic stamper or a soft stamper.

In that case, a relation between transfer rate and peeling property is an important factor. In particular, in order to provide a peeling property from the stamper, it is necessary to use a material with a good peeling property of the transfer layer according to the material of every kind of stamper. Above all, the soft stamper uses a resin substrate and is mainly utilized in a single-use manner, and therefore, it is not preferable from a cost or environmental standpoint. On the other hand, since the metallic stamper can be repeatedly used, it can be expected to be able to solve the foregoing problem. In this respect, the metallic stamper as referred to in the invention includes, in addition to a stamper formed of a metal such as Ni, etc., one prepared by forming a metal film on the surface of a stamper constituted of a material other than a metal, such as a stamper made of resin, etc.

In Patent Document 4, by providing a difference in a residual bonding rate between the back and front of the transfer layer, it is made easy to undergo peeling from the stamper, and an adhesion to the reflection layer is increased. However, since Patent Document 4 is targeted on DVD-ROM, it focuses mainly on the adhesion between an Ni stamper and a silver-based reflection layer.

However, multilayering of a write-once type optical information recording medium differs from the foregoing DVD-ROM in that an adhesive property between a metallic stamper and a protective film of an inorganic material provided on a recording layer is a problem.

That is, in the case of a write-once type optical information recording medium, when an organic dye layer of an azo-based dye, a cyanine-based dye or the like is used for a recording layer as a first layer, in forming a second layer using a resin film, a transfer sheet or the like, for the purpose of preventing mingling of a solvent or the like from the foregoing resin layer or transfer sheet into the recording layer from occurring, it is necessary to form a protective film on the organic dye layer.

As such a protective film, a protective film composed mainly of an inorganic material such as $SiO_2$, $ZnS$—$SiO_2$, $ZnO$—$SiO_2$, $Nb_2O_5$—$Al_2O_3$, etc. is used. However, in the case of using the second layer using a metallic stamper, it has become clear that the resin film or transfer sheet with a high peeling property from an Ni stamper is also high in a peeling property from such an inorganic material and is easily peeled off.

In view of the foregoing circumstances, this invention has been made, and an object thereof is to make it possible to provide a multilayer type optical information recording medium wherein in multilayering of an optical information recording layer of a write-once type optical information recording medium, when a second layer is formed using a metallic stamper, an interlayer is provided with a function to make both a peeling property from the stamper and an adhesive property to a first layer compatible with each other, thereby making a protective layer composed of an inorganic material free from peeling.

Means for Solving the Problems

In order to attain the foregoing object, the present inventors conducted extensive and intensive investigations. As a result, they have obtained knowledge that by configuring an interlayer to include a double layer structure composed of a first film having a high peeling resistance against an inorganic material and a second film having a low peeling resistance against an inorganic material, the foregoing problems in multilayering of an optical information recording layer can be solved.

The invention has been accomplished on the basis of such knowledge and is as follows.

[1] A multilayer type optical information recording medium comprising a substrate; a first optical information recording layer having at least a reflection layer, a recording layer and a protective layer for protecting the recording layer formed successively on the substrate; an interlayer disposed on the protective layer of the first optical information recording layer and having a guide groove formed on the surface opposite to the first optical information recording layer; a second optical information recording layer having a reflection layer, a recording layer and a protective layer formed successively on the interlayer; and a light transmission layer formed on the second optical information recording layer, which is characterized in that the interlayer is constituted by multiple films of a first film contacting the protective layer and a second film contacting the reflection layer; materials of the first and second films are constituted of materials different from each other; and a peeling resistance of the material of the first film against a material of the protective layer of the first optical information recording layer is higher than that of the second film.

[2] The optical information recording medium as set forth in [1], which is characterized in that a film thickness of the first film is smaller than a film thickness of the second film.

[3] The multilayer type optical information recording medium as set forth in [1] or [2], which is characterized in that the interlayer is constituted by multiple films of a first film contacting the protective layer and a second film contacting the reflection layer; materials of the first and second films are constituted of materials different from each other; and the material of the first film is harder than that of the second film.

[4] The multilayer type optical information recording medium as set forth in [1], which is characterized in that the interlayer is constituted by multiple films of a first film contacting the protective layer and a second film contacting the reflection layer; materials of the first and second films are constituted of materials different from each other; and the material of the first film is higher in Vickers hardness than that of the second film.

[5] The optical information recording medium as set forth in [2], which is characterized in that the thickness of the first film is from 5 to 10 μm; and the thickness of the second film is from 15 to 20 μm.

[6] The optical information recording medium as set forth in [2], which is characterized in that the thickness of the first film is from 5 to 10 μm; the thickness of the second film is from 15 to 20 μm; and a total thickness of the first layer and the second layer is from 20 to 30 μm.

[7] The optical information recording medium as set forth in [1], which is characterized in that the second optical information recording layer is configured to include a plurality of optical information recording layers.

[8] The optical information recording medium as set forth in [1], which is characterized in that the recording layer is constituted of an organic material including an organic dye.

[9] A method for manufacturing a multilayer type optical information recording medium, which is characterized by forming successively on a substrate at least a reflection layer, a recording layer and a protective layer for protecting the recording layer, thereby preparing a first optical information recording layer;

forming a first film on the protective layer of the first optical information recording layer, semi-curing it, disposing a second film on the first film, irradiating an ultraviolet ray from the substrate side while pressing a metallic stamper onto the surface of the second film to cure the first and second films, and after curing, undergoing peeling from the metallic stamper, thereby forming an interlayer; and further forming at least one second optical information recording layer on the interlayer and forming a light transmission layer on the second optical information recording layer.

[10] The method for manufacturing a multilayer type optical information recording medium as set forth in [9], which is characterized in that materials of the first and second films are constituted of materials different from each other; and a peeling resistance of the material of the first film against a material of the protective layer of the first optical information recording layer is higher than that of the second film.

[11] The method for manufacturing a multilayer type optical information recording medium as set forth in [9] to [10], which is characterized in that a film thickness of the first film is smaller than a film thickness of the second film.

[12] The method for manufacturing a multilayer type optical information recording medium as set forth in [9] to [10], which is characterized in that the material of the first film is harder than that of the second film.

[13] The method for manufacturing a multilayer type optical information recording medium as set forth in [9] to [10], which is characterized in that the first film is higher in Vickers hardness than the second film.

[14] The method for manufacturing a multilayer type optical information recording medium as set forth in [9] to [10], which is characterized in that the formation of the second film is carried out by a method for laminating a sheet.

[15] The method for manufacturing a multilayer type optical information recording medium as set forth in [9] to [10], which is characterized in that the formation of the first film is carried out by a spin coating method.

By adopting such a method, since it is possible to reuse the stamper, it becomes possible to make a number of duplicates with a single stamper. In particular, by using a sheet having a first film and a second film integrated therewith as the interlayer, since the formation of the interlayer can be achieved by a single step, it becomes possible to provide a method for manufacturing a multilayer type optical information recording medium in which the number of manufacturing steps can be reduced.

Advantages of the Invention

According to the invention, by using an interlayer which is configured to include the first film having a high peeling resistance against an inorganic material and the second film having a low peeling resistance against an inorganic material, when peeled off from the metallic stamper, the first protective layer is not separated, whereby a configuration capable of efficiently manufacturing a multilayer type optical information recording medium can be provided.

MODES FOR CARRYING OUT THE INVENTION

The multilayer type write-once type optical information recording medium of the invention is described by reference to the drawings.

Figure 1:
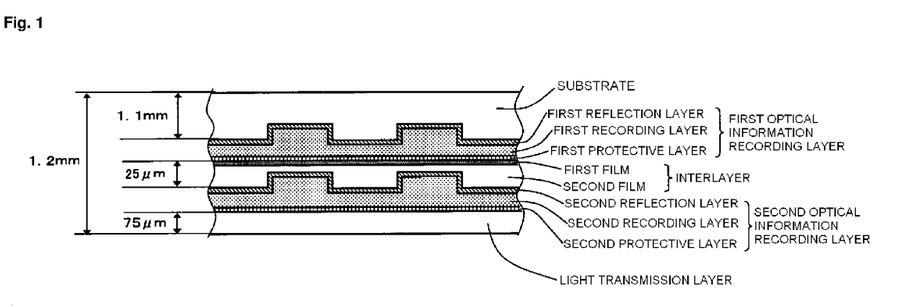
FIG. 1 is a partial sectional view schematically showing an outline of a stacked structure of a double layer type optical information recording medium using an organic dye.

FIG. 1 is a partial sectional view schematically showing a stacked structure of a double layer type optical information recording medium capable of undergoing recording and playback by a laser beam.

In this embodiment, an interlayer is formed on a first optical information recording layer having a first reflection layer undergoing total reflection of light, a first recording layer composed of an organic dye and a first protective layer composed of an inorganic material stacked on a substrate; a second optical information recording layer having a second reflection layer composed of a semitransparent metal, a second recording layer composed of an organic dye and a second protective layer composed of an inorganic material successively stacked thereon is formed on the interlayer; and finally, a light transmission layer is formed on the light incident side.

The multilayer type optical information recording medium of the invention is not limited to the one shown in FIG. 1, and there is no particular limitation so far as it is a medium in which a stacked structure where at least a reflection layer, a recording layer and a protective layer are formed in this order is included as an "optical information recording layer" of a single basic configuration, and two of more of the "optical information recording layer" are provided in the stacking direction on a substrate. For example, in BD-R using an inorganic material for a recording layer, a dielectric layer capable of enhancing optical absorption is formed between a reflection layer and a recording layer; however, since it basically has a stacked structure where a reflection layer, a recording layer and a protective layer are formed in this order, this configures the "optical information recording layer" as referred to in the invention. In the case of multilayering the "optical information recording layer" in the invention, it is important to ?make? an interlayer intervene between an optical information recording layer and an optical information recording layer.

As the foregoing substrate, various materials which are used as a light transmission substrate material of the conventional optical information recording medium can be optionally chosen and used. Specific examples thereof include polycarbonates, acrylic resins such as polymethyl methacrylate, etc., vinyl chloride-based resins such as polyvinyl chloride, vinyl chloride copolymers, etc., epoxy resins, amorphous polyolefins, polyester resins, metals such as aluminum, etc., glass and the like, and these materials may be used jointly as the need arises. Of the foregoing materials, from the standpoints of molding property, moisture resistance, dimensional stability, low costs and the like, thermoplastic resins are preferable, and polycarbonates are especially preferable.

In the case of using such a resin, it is preferable to prepare the substrate in a prescribed shape (a disc shape in the case of an optical disc) by a method such as injection molding, etc. Additionally, a thickness of the foregoing substrate is preferably regulated in the range of from 0.9 to 1.1 mm. Further, it should not be construed that the invention is limited thereto, and for example, in the case of using an ultraviolet curable resin, the ultraviolet curable resin is coated on a base and then a coating film thereof can be cured for use.

Also, a spiral-shaped groove provided on the foregoing substrate is formed simultaneously at the time of injection molding of the substrate by disposing a stamper having spiral-shaped fine irregularity of a reverse pattern to the foregoing groove on one principal surface thereof within a die used for injection molding of the substrate.

The reflection layer in the invention is one capable of reflecting a laser beam for undergoing recording and/or play- back of a data. In order to increase a reflectance against the laser beam or impart a function to improve a recording and playback characteristic, the reflection layer is provided between the substrate and the recording layer and between the interlayer and the recording layer, respectively. With respect to a device for configuring this reflection layer, the reflection layer is formed on the surface of the substrate on which the foregoing groove is formed by, for example, a deposition method, an ion plating method, a sputtering method, etc. Above all, a sputtering method is especially preferable from the standpoints of mass production and costs.

The reflection layer in the first optical information recording layer is a total reflection layer, and as a material constituting it, any material is useful so far as it is preferably used in a usual Blu-ray disc. For example, a metal film made of Au, Al, Ag, Cu, Pd, etc., an alloy film made of these metals, or an alloy film made of such a metal having a trace component added thereto is preferably used.

Also, the reflection layer in the second optical information recording layer is semitransparent and is required to have a light transmissivity ranging from 30 to 60% and an optical reflectance ranging from 15 to 35% relative to a recording and playback laser beam. When the reflection layer falls outside the foregoing ranges, the light transmissivity is too low so that recording and playback of the first recording layer become difficult; or when the optical reflectance is too low, recording/playback into/from the second recording layer becomes difficult, whereby good double layer type recording and playback become difficult. As a material constituting this layer, the same materials as in the foregoing total reflection layer are useful, and the transmissivity of the reflection layer is adjusted by the film thickness.

In the invention, it is preferable that the recording layer contains an optical absorption material constituted of an organic dye capable of absorbing a laser beam. Above all, the recording layer is preferably a dye type optical recording layer where a pit is formed upon laser irradiation, thereby recording data. As the foregoing organic dye, a phthalocyanine dye, a cyanine dye, an azo-based dye and the like are preferable. For example, it is preferable to form the recording layer by dissolving an azo dye represented by chemical formula 1 or a cyanine dye represented by chemical formula 2 together with a binder, etc. in a solvent, for example, TFP (tetrafluoropropanol), etc. to prepare a coating solution and subsequently coating this coating solution via the foregoing optical reflection layer by a spin coating method, a screen printing method, etc. to form a coating film, followed by drying, for example, at a temperature of 80° C. for about 30 minutes.

Chemical Formula 1

(In the formula, A and A' are the same as or different from each other and each represents a heterocyclic ring containing one or plural hetero atoms selected among a nitrogen atom, an oxygen atom, a sulfur atom, a selenium atom and a tellurium atom; $R_{21}$ to $R_{24}$ each independently represents a hydrogen atom or a substituent; and $Y_{21}$ and $Y_{22}$ are the same as or different from each other and each represents a hetero atom selected among elements belonging to the Group 16 of the periodic table.)

Chemical Formula 2

(In the formula, $\Phi^+$ and $\phi$ each represents an indolenine ring residue, a benzoindolenine ring residue or a dibenzoindolenine ring residue; L represents a connecting group for forming a mono- or dicarbocyanine dye; $X^-$ represents an anion; and m represents an integer of 0 or 1.)

In this respect, in the invention, an optical absorption material constituted of an inorganic material may be used as the recording layer. As such an inorganic material, Te—Pd, Si—Cu, Ge—Bi and the like are useful. The inorganic material-based recording layer is formed by film deposition by deposition, sputtering, or the like, of such a material.

In the invention, the protective layer is provided between the recording layer and the interlayer and between the recording layer and the light transmission layer, respectively, for the purposes of regulating a recording characteristic, etc. or enhancing an adhesive property, and preventing mingling into the recording layer by a solvent or an adhesive of the interlayer or light transmission layer. The protective layer is preferably a transparent film composed of an inorganic material such as $SiO_2$, $ZnS$—$SiO_2$, $ZnO$—$SiO_2$, $Nb_2O_5$—$Al_2O_3$, etc. and is formed by, for example, a deposition method, an ion plating method, a sputtering method, etc. Above all, a sputtering method is especially preferable from the standpoints of mass production and costs. In this respect, with respect to the inorganic material-based recording layer, the same layer as in the foregoing protective layer is formed. A material to be used is also the same. In the case of the inorganic material-based recording layer, it is formed for the purpose of enhancing the optical absorption similar to the foregoing dielectric layer.

Figure 2:
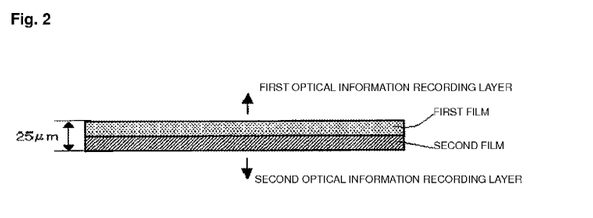
FIG. 2 is an outline view showing an example of an interlayer of the invention.

FIG. 2 is an outline view showing an example of the interlayer of the invention.

As shown in FIG. 2, the interlayer of the invention is composed of a first film having a surface for contacting the protective layer and a second film having a surface for contacting the reflection layer.

In FIG. 2, though the total thickness is set up at 25 μm, since the second film is a film onto which a pattern of the stamper is transferred, a thickness of the first film may be several μm or less, and preferably from 5 to 10 μm.

The invention is characterized in that the first film is higher in a peeling resistance against an inorganic material than the second film and that the second film is lower in a peeling resistance against an inorganic material than the first film. In this respect, the inorganic material as referred to herein also includes a metal such as Ni, etc. The higher the Vickers hardness, the higher the peeling resistance against an inorganic material is. In consequence, it is desirable that the second film is lower in Vickers hardness than the first film.

Though the foregoing second reflection layer (semitransparent) is formed on the second film having a low peeling resistance against an inorganic material, as described previously, the second reflection layer is preferably formed by a sputtering method. According to the sputtering method, since the film deposition is achieved so as to drive a metallic particle into the surface of the film, the film-deposited metal film is formed such that it bits into the second film. Accordingly, the second reflection layer formed on the second film hardly peels off from the second film.

With respect to a material of the first film, for example, Du Pont's SURPHEX is suitably used as a sheet-shaped material; and for example, DIC's SD-694 (Vickers hardness: 3,400 MPa) is suitably used as a liquid material.

Also, with respect to a material of the second film, for example, Bridgestone's UV-curing nano imprinting acrylic resin-based adhesion/transfer sheet (Vickers hardness: 100 MPa) is suitably used as a sheet-shaped material; and for example, DIC's BD-ROM material (Vickers hardness: 1,760 MPa) is suitably used as a liquid material.

After the ruggedness is formed on the foregoing interlayer by a metallic stamper, an ultraviolet ray is irradiated from the substrate side or metallic stamper side to cure the interlayer, and thereafter, the second or et seq. optical information recording layers are formed.

Figure 3:
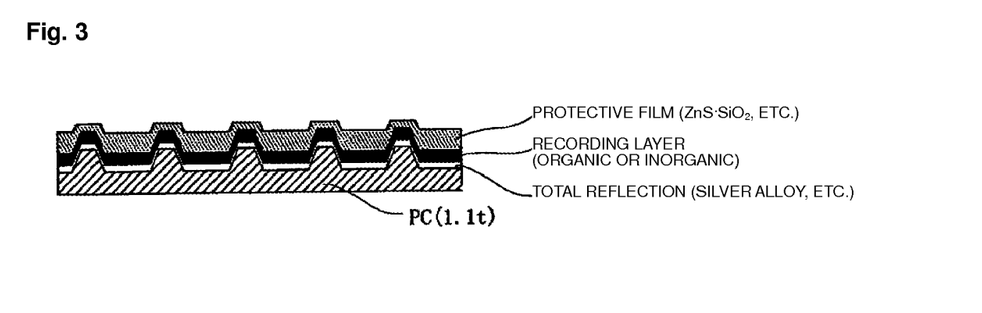
FIG. 3 is a view schematically showing a first optical information recording layer formed on a substrate before an interlayer is transferred.
Figure 4:
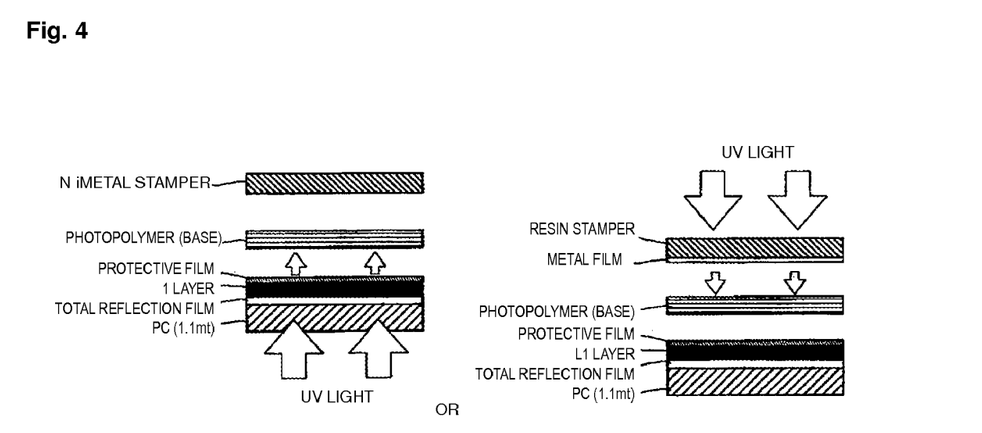
FIG. 4 is an outline view schematically showing a transfer method of a irregularity pattern onto an interlayer.

FIG. 3 is a view schematically showing the first optical information recording layer formed on the substrate before the interlayer is transferred; and FIG. 4 is an outline view schematically showing an example of the transfer method of the ruggedness pattern onto the interlayer.

As shown in FIG. 4, with respect to the irradiation direction of an ultraviolet ray, in the case where the metallic stamper is a stamper made of a metal, the ultraviolet ray is irradiated from the substrate side. Here, though the first reflection layer intervenes on the substrate side, since the first reflection layer slightly passes the light therethrough, the ultraviolet ray may be irradiated slightly strongly. Also, in the case where the metallic stamper is a stamper in which a metal film is formed on a stamper made of resin or the like, the ultraviolet ray is irradiated from the stamper side. Since the thickness of the metal film of the metallic stamper is sufficient to such extent that the light passes therethrough, the ultraviolet ray can be irradiated from the metallic stamper side.

In the invention, the foregoing light transmission layer is preferably one made of a transparent resin. More specifically, for example, it is preferable to use a sheet made of a resin with good light transmission, such as a polycarbonate resin, an acrylic resin, etc., or to coat such a resin to form a light transmission layer.

The foregoing light transmission layer is configured such that in general, a laser beam having a wavelength in the vicinity of from 400 nm to 420 nm is irradiated, whereby data is recorded into the first recording layer and the second recording layer and/or read out from the first recording layer and the second recording layer. A thickness of the light transmission layer is preferably 0.1 mm in total including the optical information recording layer and the interlayer. That is, in the case of a double layer type, the thickness is preferably 0.75 mm.

Specific examples of a method for forming the light transmission layer are enumerated below, but it should not be construed that the invention is limited thereto.

(a) After an ultraviolet curable adhesive containing an acrylic resin as a principal ingredient is coated on the substrate having the second protective layer formed thereon, a disc-shaped sheet made of a polycarbonate resin and having a thickness of 0.1 mm is affixed, and the adhesive is cured by irradiating with ultraviolet light, thereby obtaining a disc-shaped optical information recording medium having a thickness of about 1.2 mm.

(b) A light transmission layer composed of a 0.1 mm-thick sheet made of a polycarbonate is fixed to the substrate having the second protective layer formed thereon via a transparent adhesive, thereby obtaining a disc-shaped optical information recording medium having a thickness of about 1.2 mm.

(c) A resin containing an acrylic resin as a principal ingredient is coated on the substrate having the second protective layer formed thereon by a spin coating method and then cured with ultraviolet light to form a cover layer having a thickness of 0.1 mm, thereby obtaining a disc-shaped optical information recording medium having a thickness of about 1.2 mm.

EXAMPLES

The invention is more specifically described with reference to the Examples, but it should be construed that the invention is not in any way limited thereto.

(Evaluation of Adhesion and Peeling Property)

Figure 5:
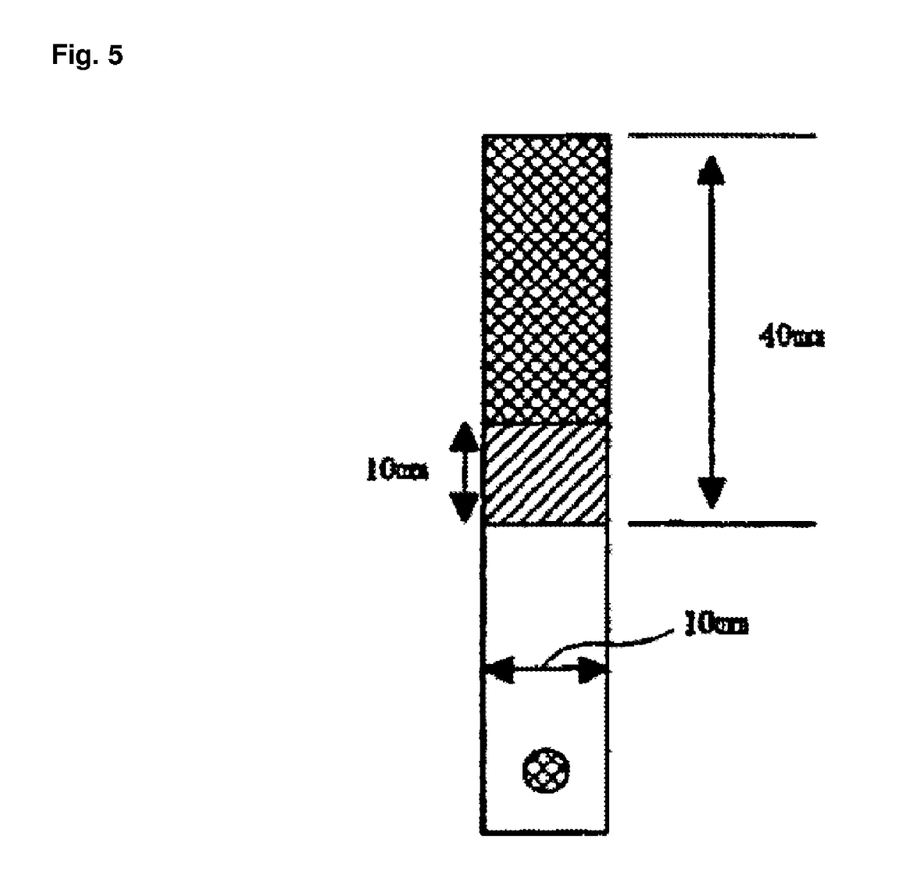
FIG. 5 is a view showing a specimen used for a peeling test.
Figure 6:
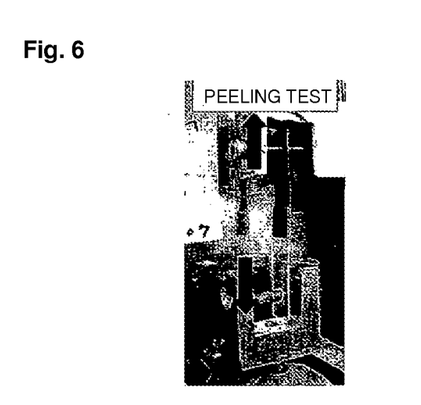
FIG. 6 shows a peeling test device.

(1) Evaluation of ultraviolet curable resin and ultraviolet curable bonding sheet:

A polycarbonate (PC) substrate having a diameter of 120 mm and a thickness of 1.1 mm, which had been formed by means of injection molding, was prepared, and as shown in FIG. 5, a specimen having a width of 10 mm and a length of 40 mm was cut out from the substrate. This is designated as "Specimen 1". Specimen 2 is formed in the following manner. First, as to a specimen of $ZnS.SiO_2$, a polycarbonate substrate having a diameter of 120 mm and a thickness of 1.1 mm, which had been formed by means of injection molding, was prepared; $ZnS.SiO_2$ was subjected to film deposition on this substrate by sputtering, and a specimen having a width of 10 mm and a length of 40 mm was cut out from the substrate. As to a specimen of Ni, a specimen having a width of 10 mm and a length of 40 mm was cut out from an Ni stamper. A sample prepared by joining 10 mm of the respective ends of Specimen 1 and Specimen 2 to each other via a commercially available ultraviolet curable resin or ultraviolet curable bonding sheet (thickness: 25 μm) was used and measured for a peeling resistance ($N/cm^2$) using a peeling test device shown in FIG. 6. The results are shown in Table 1.

As a result, it is understood that as a material of the first film having a high peeling resistance against an inorganic material, a material having a relatively high Vickers hardness such as Du Pont's SURPHEX for a sheet-shaped material or DIC's SD-694 for a liquid material is preferably used; whereas as a material of the second film having a low peeling resistance from the Ni stamper, a material having a relatively low Vickers hardness such as a Bridgestone's UV-curing nano imprinting acrylic resin-based adhesion/transfer sheet for a sheet-shaped material or a DIC's BD-ROM material for a liquid material is preferably used.

TABLE 1

| | Specimen 1 | Ultraviolet curable resin | Specimen 2 | Peeling resistance ($N/cm^2$) |
|---|---|---|---|---|
| (1) | PC | UV sticking sheet | $ZnS \cdot SiO_2$ sputtered PC | 30 |
| (2) | PC | SURPHEX | $ZnS \cdot SiO_2$ sputtered PC | 200 |
| (3) | PC | UV resin (SD694) | $ZnS \cdot SiO_2$ sputtered PC | 140 |
| (4) | PC | UV resin (BD-ROM) | $ZnS \cdot SiO_2$ sputtered PC | 70 |

TABLE 1-continued

| Specimen 1 | Ultraviolet curable resin | Specimen 2 | Peeling resistance (N/cm$^2$) |
|---|---|---|---|
| (5) PC | UV sticking sheet | Ni | 50 |
| (6) PC | SURPHEX | Ni | 225 |
| (7) PC | UV resin (SD694) | Ni | 105 |
| (8) PC | UV resin (BD-ROM) | Ni | 90 |

UV sticking sheet: Bridgestone's acrylic resin-based sticking transfer sheet
SURPHEX: Du Pont's ultraviolet curable bonding sheet
UV resin (SD694): DIC's liquid ultraviolet curable resin
UV resin (BD-ROM): DIC's liquid ultraviolet curable resin (2) Evaluation of adhesion and peeling property of interlayer:

The same test was carried out using a PC substrate having ZnS.SiO$_2$ sputtered thereon for the Specimen 1 and Ni for the Specimen 2.

Figure 7:
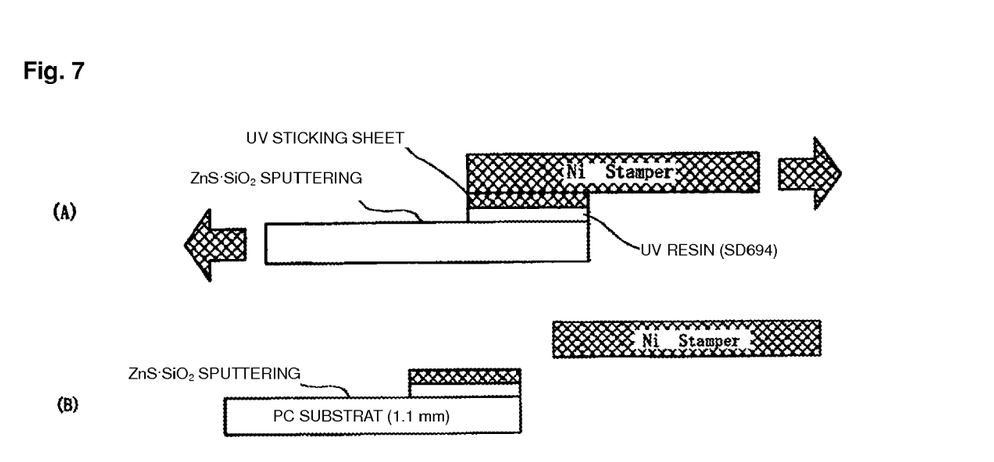
FIG. 7 is a view showing an outline of a specimen used for a confirmatory test.

FIG. 7 is a view showing an outline of an example of a specimen. The results are shown in Table 2. A difference in peeling resistance was determined based on the results shown in Table 1 according to the following subtraction calculation on the basis of the specimen number, and the results are shown in Table 2.

(Peeling resistance against Specimen 1)−(Peeling resistance against Specimen 2)[N/cm$^2$]

A ratio of peeling resistance was calculated based on the results shown in Table 1 according to the following expression.

[(Difference in peeling resistance)/(Peeling resistance against Specimen 2)]×100 [%]

side of the substrate, and a total reflection layer of silver was formed in a thickness of 60 nm thereon by a sputtering method. Subsequently, the dye represented by foregoing chemical formula 1 was subjected to film deposition in a thickness of 60 nm by a spin coating method, and a protective film having a thickness of from 20 to 25 nm was further formed thereon by a sputtering method, thereby preparing an experimental article (see FIG. 3).

Next, a transfer layer, which is the interlayer, is formed on the obtained experimental article as described below.

Example 1

A DIC's UV resin SD694 was formed in a thickness of 20 μm as a first film (transfer layer 1) having a high peeling resistance against an inorganic material on the protective film of the experimental article by a spin coating method, and the surface was cured. Thereafter, a Bridgestone's ultraviolet curable bonding sheet having a thickness of 5 μm was stacked

TABLE 2

| | Specimen 1 | Interlayer 1 | Interlayer 2 | Specimen 2 | Difference in peeling resistance (N/cm$^2$) | Ratio of peeling resistance (%) | Peeling from Ni |
|---|---|---|---|---|---|---|---|
| (9) | ZnS•SiO$_2$ sputtered PC | UV bonding sheet | No | Ni | [(1)-(5)] −20 | {[(1)-(5)]/(5)} −40% | Poor |
| (10) | ZnS•SiO$_2$ sputtered PC | SURPHEX | No | Ni | [(2)-(6)] −25 | {[(2)-(6)]/(6)} −11% | Poor |
| (11) | ZnS•SiO$_2$ sputtered PC | UV resin (SD694) | No | Ni | [(3)-(7)] 35 | {[(3)-(7)]/(7)} 33% | Poor |
| (12) | ZnS•SiO$_2$ sputtered PC | UV resin (BD-ROM) | No | Ni | [(4)-(8)] −20 | {[(4)-(8)]/(8)} −22% | Poor |
| (13) | ZnS•SiO$_2$ sputtered PC | UV resin (SD694) | UV sticking sheet | Ni | [(3)-(5)] 90 | {[(3)-(5)]/(5)} 180% | Good |
| (14) | ZnS•SiO$_2$ sputtered PC | UV resin (SD694) | UV resin (BD-ROM) | Ni | [(3)-(4)] 70 | {[(3)-(4)]/(4)} 100% | Good |
| (15) | ZnS•SiO$_2$ sputtered PC | SURPHEX | UV resin (BD-ROM) | Ni | [(2)-(4)] 130 | {[(2)-(4)]/(4)} 185% | Good |

In this respect, in Sample 9 and Sample 12, though peeling from Ni is good, peeling from the Specimen 1 also occurs, and therefore, the overall evaluation was designated "poor". It was understood from these results that when the interlayer is configured of two layers, peeling from Ni is desirable. Also, it was understood that the ratio of peeling resistance is preferably +100% or more.

(Preparation of Experimental Article)

A polycarbonate substrate having a diameter of 120 mm and a thickness of 1.1 mm was prepared by means of injection molding. A groove of the first layer was transferred onto one as a second film (transfer layer 2) having a low peeling resistance against an inorganic material on the transfer layer 1. Subsequently, an Ni stamper was pressed onto the transfer layer 2, and ultraviolet light was irradiated from the substrate side, thereby curing the transfer layer 2. Thereafter, the Ni stamper was peeled off.

Example 2

A 5 μm-thick Bridgestone's ultraviolet curable bonding sheet was used as the transfer layer 2 and pressed onto an Ni stamper. Subsequently, a DIC's UV resin SD694 was formed in a thickness of 20 μm as the transfer layer 1 on the protective film of the experimental article by a spin coating method. Subsequently, after the transfer layer 1 and the transfer layer 2 were laminated by means of vacuumbonding, curing was carried out from the substrate side, and the Ni stamper was peeled off.

Example 3

Transfer was carried out while pressing a stamper in the same manner as in Example 2, except that with respect to the transfer layers to be formed in the foregoing experimental article, a DIC's UV resin SD694 was formed in a thickness of 15 μm as the transfer layer 1 by a spin coating method and then cured; and that a DIC's UV resin BD-ROM was formed in a thickness of 10 μm as a second layer similarly by a spin coating method, thereby forming the transfer layer 2.

Comparative Example 1

The transfer layer to be formed in the foregoing experimental article was formed of only a 25 μm Bridgestone's ultraviolet curable bonding sheet; after pressing an Ni stamper, an ultraviolet ray was irradiated from the substrate side to cure the transfer layer; and the Ni stamper was peeled off.

Comparative Example 2

The transfer layer to be formed in the foregoing experimental article was formed in a thickness of 25 μm using only a DIC's UV resin BD-ROM by means of spin coating; after pressing an Ni stamper, ultraviolet light was irradiated from the substrate side to cure the transfer layer; and the Ni stamper was peeled off.

Comparative Example 3

The transfer layer to be formed in the foregoing experimental article was formed of only 25 μm-thick Du Pont's SURPHEX (bonding sheet); after pressing an Ni stamper, ultraviolet light was irradiated from the substrate side to cure the transfer layer; and the Ni stamper was peeled off.

Comparative Example 4

The transfer layer to be formed in the ?foregoing? experimental article was formed in a thickness of 25 μm using only a DIC's UV resin SD694 by means of spin coating; after pressing an Ni stamper, ultraviolet light was irradiated from the substrate side to cure the transfer layer; and the Ni stamper was peeled off.

The results of Examples 1 to 3 and Comparative Examples 1 to 4 are shown in Table 3.

TABLE 3

|  | Peeling property from stamper | Adhesion to protective film |
| --- | --- | --- |
| Example 1 | Good | Good |
| Example 2 | Good | Good |
| Example 3 | Good | Good |
| Comparative Example 1 | Good | Poor: Transfer defect found |
| Comparative Example 2 | Good | Poor: Transfer defect found |
| Comparative Example 3 | Poor | Good |
| Comparative Example 4 | Poor | Good |

As a result, the state where both the peeling property from stamper and the adhesion to protective film were good was found only in Examples 1 to 3. Comparative Examples 1 to 4 were not satisfactory in only one of them and unsuited to the invention. From these results, it was proven that a relation between the first film contacting the protective layer and the second film contacting the reflection layer is required such that the first film is higher in a peeling resistance against an inorganic material than the second film.

The invention claimed is:

1. A method for manufacturing a multilayer type optical information recording medium, which is characterized by forming successively on a substrate at least a reflection layer, a recording layer and a protective layer for protecting the recording layer, thereby preparing a first optical information recording layer;

forming a first film on the protective layer of the first optical information recording layer, semi-curing it, disposing a second film on the first film, irradiating an ultraviolet ray from the substrate side while pressing a metallic stamper onto the surface of the second film to cure the first and second films, and after curing, undergoing peeling from the metallic stamper, thereby forming an interlayer; and further forming at least one second optical information recording layer on the interlayer and forming a light transmission layer on the second optical information recording layer.

2. The method for manufacturing a multilayer type optical information recording medium according to claim 1, which is characterized in that materials of the first and second films are constituted of materials different from each other; and a peeling resistance of the material of the first film against a material of the protective layer of the first optical information recording layer is higher than that of the second film.

3. The method for manufacturing a multilayer type optical information recording medium according to claim 1, which is characterized in that a film thickness of the first film is smaller than a film thickness of the second film.

4. The method for manufacturing a multilayer type optical information recording medium according to claim 1, which is characterized in that the material of the first film is harder than that of the second film.

5. The method for manufacturing a multilayer type optical information recording medium according to claim 1, which is characterized in that the first film is higher in Vickers hardness than the second film.

6. The method for manufacturing a multilayer type optical information recording medium according to claim 1, which is characterized in that the formation of the second film is carried out by a method for laminating a sheet.

7. The method for manufacturing a multilayer type optical information recording medium according to claim 1, which is characterized in that the formation of the first film is carried out by a spin coating method.

8. The method for manufacturing a multilayer type optical information recording medium according to claim 2, which is characterized in that a film thickness of the first film is smaller than a film thickness of the second film.

9. The method for manufacturing a multilayer type optical information recording medium according to claim 2, which is characterized in that the material of the first film is harder than that of the second film.

10. The method for manufacturing a multilayer type optical information recording medium according to claim 2, which is characterized in that the first film is higher in Vickers hardness than the second film.

11. The method for manufacturing a multilayer type optical information recording medium according to claim 2, which is characterized in that the formation of the second film is carried out by a method for laminating a sheet.

12. The method for manufacturing a multilayer type optical information recording medium according to claim 2, which is characterized in that the formation of the first film is carried out by a spin coating method.

* * * * *